Figure 1:
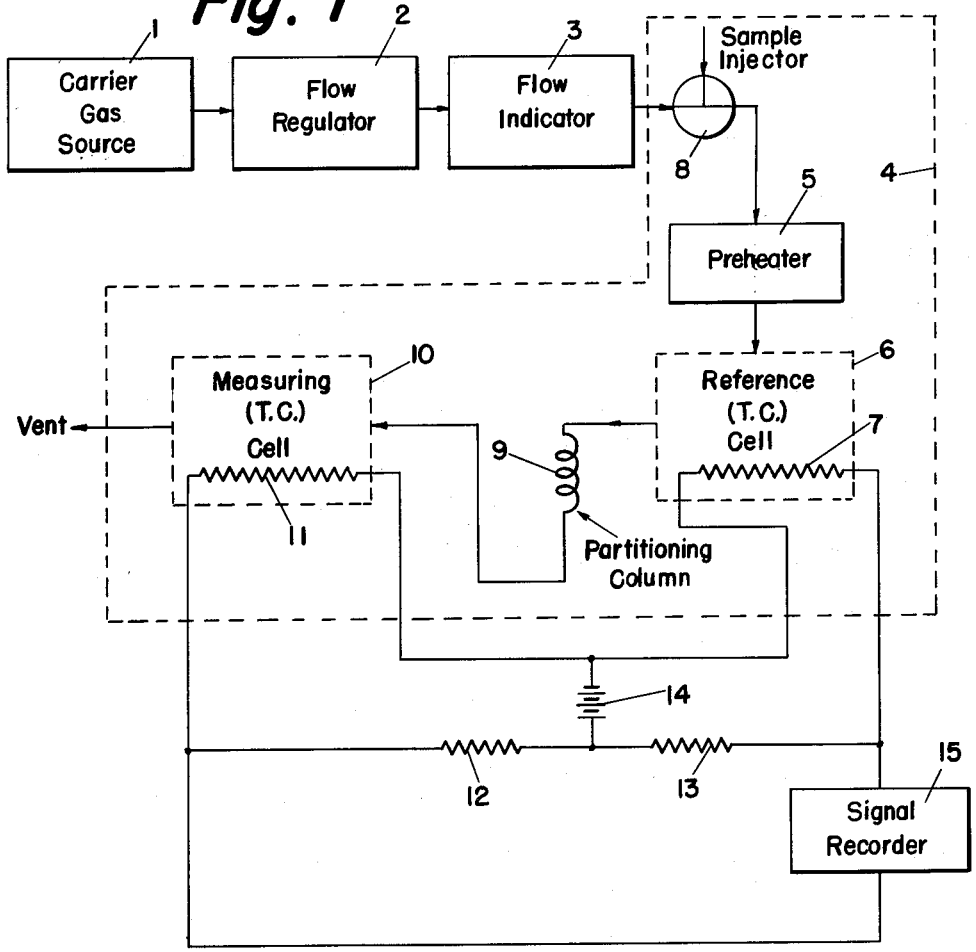

March 31, 1964    C. R. ARMSTRONG    3,126,731

COMPENSATED GAS CHROMATOGRAPH

Filed Oct. 16, 1958

INVENTOR.
CHARLES R. ARMSTRONG

BY Robert O. Spindle

ATTORNEY

United States Patent Office 3,126,731
Patented Mar. 31, 1964

3,126,731
COMPENSATED GAS CHROMATOGRAPH
Charles R. Armstrong, Broomall, Pa., assignor to Sun Oil Company, Philadelphia, Pa., a corporation of New Jersey
Filed Oct. 16, 1958, Ser. No. 767,591
6 Claims. (Cl. 73—23)

This invention relates to gas chromatography, and more particularly to a method and means for effecting automatic checking of the stability and calibration of gas chromatography apparatus.

Gas chromatography is a process for separating gaseous mixtures into their components, and identifying the separated components, both qualitatively and quantitatively. In order to accomplish the separation, the mixture to be analyzed, called the sample, is swept through a so-called partitioning column by means of a moving "carrier" gas. The column is packed with a porous material which is coated with a high-boiling-point solvent, called the partition liquid. Components in the sample ordinarily have a greater affinity for solution in the partition liquid than does the carrier gas. The constant motion of the carrier gas immediately reduces the vapor pressure of the dissolved component and causes it to revaporize. The process of solution and revaporization is repeated many times for each component of the sample, as it is swept through the packed column. The time required for a component to traverse the column is called its retention time. Since different components have different solubilities in the partition liquid, each component will have a different retention time. Thus, gaseous mixtures can be separated into their components.

In order to identify the separated components, detection of the individual components is effected by comparing some characteristic property of the separated gases with the same property of the carrier gas. Identification of an individual component is made by noting its respective retention time. Thus, gas chromatography is not a primary analytical tool, but requires calibration in order to identify components separated from mixtures; calibration is accomplished by determining the retention times of pure components. The gas chromatography technique provides a separation of components from a complex mixture without destruction, and without chemical or molecular changes.

Certain prior or conventional types of gas chromatography apparatus have operated in the following way. The carrier gas, after being passed through a flow regulator and a preheater (the latter for ensuring adequate time for the carrier gas to reach equilibrium with the ambient temperature inside a heated enclosure which contains most of the apparatus), is passed through a reference detector, e.g., a device sensitive to thermal conductivity. Following the reference detector, the carrier gas passes into the partitioning column, and a sample of the gaseous mixture to be analyzed is injected into the apparatus at this point (that is, between the reference detector and the partitioning column). In the partitioning column, to which are fed both the carrier gas and the sample, the separation previously described takes place, so that there emerge from the column both the steady stream of carrier gas and the separated components of the gaseous mixture, the latter components appearing in succession according to their respective retention times. Having emerged from the column, the separated components (as well as the steady carrier gas stream) pass through a measuring detector similar to the reference detector (e.g., again a device which senses the thermal conductivity of the gas that is present).

Since in the measuring detector the eluted gas replaces the reference gas by occupying space in the stream of carrier or reference gas, there will be a difference in the signals produced in the reference and measuring detectors or cells. One method used to detect this signal difference is to connect the two cells as two of the arms of a normally-balanced four-arm Wheatstone bridge circuit in which the remaining two arms are fixed resistors. A power supply is connected across one diagonal of the bridge and a signal recorder is connected across the other bridge diagonal. Unbalance in any one of the bridge resistors will be indicated on the recorder. Specifically, if two of the arms of the bridge are constituted by fixed resistors, and the reference cell resistance is fixed by the carrier gas, then an unbalanced condition (and a corresponding indication on the recorder) will be caused when some gas other than carrier gas (e.g., one of the components of the sample mixture) fills the measuring cell.

In the above-described conventional apparatus, stringent precautions must be taken to ensure constant carrier flow, pressure, bridge power supply voltage, temperature, and sample size, since if any one of these parameters changes, it will be sensed by the recorder in the same way as a change in the thermal conductivity. Since the change in thermal conductivity is the crux of the gas chromatography measurement, the apparatus should be provided with some sort of means that could indicate whether the recorded signal is due to a change in physical quantities in the system, or is due to the thermal conductivity characteristic of the gas under test.

It would therefore be highly desirable to have some means of checking the stability of the apparatus before each analysis, especially when the apparatus is being used for repetitive analysis of a continuously-flowing stream. One method of doing this might be to analyze a standard sample before each unknown mixture is analyzed. Another method might be to insert a measured quantity of some pure compound into the unknown mixture before analysis and then use the signal peak of the pure compound as the reference peak. However, neither of these methods is simple or easy to accomplish.

An object of this invention is to provide a simple, easy method for checking the stability and calibration of gas chromatography apparatus.

Another object is to provide a means for effecting automatic checking, before each analysis, of the various parameters of a gas chromatography system.

The objects of this invention are accomplished, briefly, in the following manner:

By relocating the point of sample injection, a composite sample signal (reference peak) is provided which will vary only with sample size, provided the assumption is made that all other parameters remain constant. Even if such assumption does not hold, a check is thus offered, before each analysis, on the system. Specifically, by injecting the sample at a point in the carrier stream prior to the reference cell, such a composite signal or reference peak is provided, any change in the system (due to a change in sample size, or in any of the other system parameters) then being indicated by a change in the size of the reference peak. Thus, such changes are in effect compensated for in the chromatogram produced.

Figure 2:
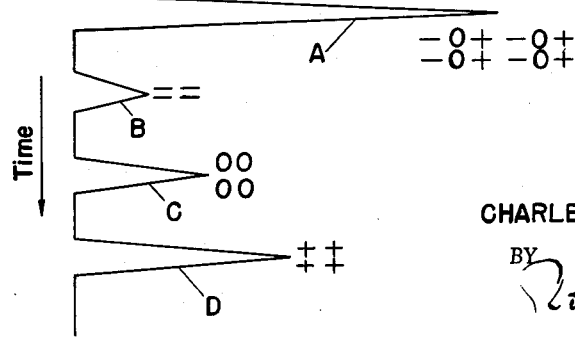

A detailed description of the invention follows, taken in conjunction with the accompanying drawing, wherein:

FIG. 1 is a schematic representation of a gas chromatography apparatus according to this invention; and FIG. 2 is a typical chromatogram obtained with the apparatus of FIG. 1.

First referring to FIG. 1, a source 1 of carrier gas may preferably comprise a commercial pressure cylinder of some inert gas such as nitrogen or helium. This gas is used to purge the system (e.g., to carry the sample from the sample injection point on through the apparatus), and to establish a constant reference. A flow regulator 2 on the "out" line of the cylinder acts to maintain a constant (small) gas flow, on the order of 100 cc./min., while a flow indicator 3, through which the carrier gas passes, serves to indicate the amount of this flow. The dotted line enclosure 4 encompasses those components which are located inside a lagged (heat insulated) enclosure that is maintained at a substantially constant elevated temperature, for example by means of a thermostat, a heater, and a circulating blower (not shown). Thus, the thermostat, heater, and blower, like the flow regulator, all act to maintain constant conditions.

From the flow indicator 3, the carrier gas passes on to a preheater 5 inside the box 4, which operates to heat the gas. The use of the preheater ensures adequate time for the carrier gas to reach equilibrium with the ambient temperature of box 4.

From the preheater 5, the carrier gas passes on to and through a reference cell 6, which is usually a device or detector sensitive to thermal conductivity. In this connection, it is noted that each gas has its own particular thermal conductivity. Device 6 may comprise an enclosure through which the gas passes, containing a heated resistance wire (filament) 7 located directly in the gas stream, or else so positioned that the gas reaches the filament by diffusion. Filament 7 is heated by any suitable means (not shown). In either case, the measured resistance of the filament depends upon the thermal conductivity of the gas passing through the cell at the moment. In order to measure such resistance, the filament 7 is utilized as one arm of a Wheatstone bridge circuit to be described in detail hereinafter.

The sample (mixture of gases) to be tested or analyzed is introduced into the carrier gas stream between flow indicator 3 and preheater 5, as indicated schematically by the "sample injector" 8. The sample can be injected by means of a hypodermic syringe, or by some convenient valve switching arrangement. The preheater 5 causes the temperature of the sample to reach equilibrium with the ambient temperature of box 4. The sample injected at 8 is caused to flow into the reference cell 6, along with the carrier gas. The action occurring in the reference cell 6 will be explained in detail hereinafter.

After passing through the reference cell 6, the sample is caused (by means of the carrier gas) to flow into the partitioning column 9. As previously described, the column is packed with a porous material coated with a high-boiling solvent, called the partition liquid. While the sample is being swept through the packed column 9, the repeated solution and revaporization process previously described takes place, resulting in the separation of the gas sample (mixture) into its various components. These different components, because of their different retention times in the column, appear separately and sequentially at the output of the partitioning column 9.

Having emerged from the column 9, the separated components (along with, of course, the carrier gas) pass through a measuring cell or detector 10, which is a twin unit to the reference cell 6 and also senses the thermal conductivity of the gas that is present. The measuring cell 10 may be quite similar in construction to reference cell 6, and contains a filament 11 heated by any suitable means (not shown). Filament 11 is utilized as another arm of the Wheatstone bridge circuit previously mentioned. More in detail, this bridge circuit includes two fixed resistors 12 and 13 which comprise the remaining two arms of the bridge, a bridge power supply 14 (a unidirectional potential source, such as a battery) connected across one diagonal of the bridge, and a signal recorder 15 connected across the other diagonal of the bridge.

On the output side of measuring cell 10, the carrier gas and the components of the sample are vented to the atmosphere.

Before the sample is injected into the apparatus described, a steady stream of carrier gas is flowing through both the reference cell 6 and the measuring cell 10. The bridge is balanced under these conditions. Therefore, a subsequent unbalance in any one of the resistors (11, 7, 12, or 13) will be detected by, and indicated by, the recorder 15. Such an unbalance will be produced when the eluted gas (coming from the injected sample) replaces the reference or carrier gas (either in the reference cell 6 or in the measuring cell 10) by occupying space in the stream of carrier gas, provided, of course, that such a replacement does not occur simultaneously in the two cells 6 and 10. If the sample is injected or introduced at 8 into the carrier gas stream prior to reference cell 6, as described, the mixture of gases constituting the sample, passing through the reference cell 6, unbalances the bridge (there being no simultaneous passage of these gases through the measuring cell 10). This gives a signal output at recorder 15 which has in effect a "composite" signal amplitude representative of all components in the sample. This is so because all of the components in the sample (gas mixture) pass through the reference cell 6 together, no separation of components having been effected prior to this point. This signal, representative of all components in the stream, is called the reference peak.

FIG. 2 is a typical chromatogram which might be obtained with the chromatography apparatus of FIG. 1. Such a chromatogram is the record produced by recorder 15. To make a chromatogram, the recording chart is driven at a uniform time rate in a longitudinal direction, and a recording pen is moved transversely across the chart in accordance with the voltage between one pair of diagonally-opposite corners of the Wheatstone bridge 12, 13, 11, 7. The zero-time-point in such a chromatogram is the time of sample injection, marked in FIGURE 2 by a corresponding legend on the time axis. The symbols "—," "0" and "+" opposite this legend represent, respectively, the three gaseous components of the sample. The reference peak is at A in FIGURE 2, occurring shortly after the sample injection time. All three symbols appear adjacent to this peak, indicating that all of the three components in the sample contribute thereto.

The reference peak A indicates the stability of the system, and the sample reproducibility. In other words, this serves as a check on the system, for each analysis. Any change in the system will be indicated in the height of the reference peak A. If any of the parameters of the system, such as carrier gas flow, pressure, voltage of the bridge power supply, temperature of the box, or sample size, change, the reference peak A height will change correspondingly. Or, if it is assumed that all other parameters remain constant, the height of reference peak A will vary only with sample size. In gas chromatography work, a reproducible measurement of some physical property (thermal conductivity in the example given) can only be valid when the assumption is made that all system parameters remain constant, unless an independent check is made on the system. However, as described previously, the present invention offers a check on the system, before each analysis.

After leaving the reference cell 6, the sample proceeds through the partitioning column 9, where the components are separated as described. As each separated component passes through the measuring cell 10, the Wheatstone bridge becomes unbalanced, since there is no simultaneous passage of such components through cell 6. Thus, each separated component develops a signal (in recorder 15) whose amplitude is representative of the amount of the same pure component present in the sample mixture.

The chromatograph system of this invention is intended to be used for streams (or individual samples) whose components are known in a qualitative sense, but not quantitatively. That is, the identity of the individual components is known in general, but not the relative proportions of such individual components. Therefore, the primary application of the inventive system is for the analysis of gaseous mixtures limited to known components.

If an "ideal" chromatograph were used, and if each of the components of the mixture had exactly the same thermal conductivity, the sum of the areas under all the component signal peaks B, C, and D in FIGURE 2 would be equal to the area under the reference peak A. To state this in another way, under these conditions the height of each of the component peaks B, C, and D would be a certain percentage of the height of the reference peak A, and this percentage would correspond to the percentage of that particular component present in the sample.

As a practical matter, however, there are inherent electronic differences (e.g., in the resistors of the bridge circuit) which would produce small errors in the heights or areas of the various peaks; also, the various components inherently have different thermal conductivities, which would produce small errors in the heights of the various component peaks. To improve the accuracy of the quantitative analysis, certain constants or multiplying factors can be respectively applied to the recorded areas under the component peaks B, C, and D. To obtain these factors, the same sample analyzed by the chromatograph is quantitatively analyzed by a mass spectrograph, which is a primary analytical tool generally accepted in the art. Thus, the quantitative analysis of the sample is ascertained; the multiplying factors necessary to make the respective chromatographic areas correspond, percentagewise, to the known percentage of the respective component can then be easily computed. Once these factors have been determined in this way, they can be employed in future analyses using the same chromatograph.

Even though the multiplying factors just described should be employed in practice, the height of each of the component peaks is, in general, proportional to the height of the reference peak A, and varies when the latter varies. By proper correlation of the component peaks, for each chromatogram, with the reference peak A for the same chromatogram, the recorded results may be made independent of the sample size, or of changes in the chromatographic apparatus; this is so because any change in the analytical system itself will be reflected in the height of the reference peak A.

Since the separated components appear separately and sequentially at the output of column 9, as previously described, and are applied in the same separate and sequential fashion to measuring cell 10, separate and sequential signal peaks are produced on the chromatogram or record, which is the chart or record provided by signal recorder 15. Thus, in the chromatogram of FIG. 2, the first component signal peak B appears at a time following the reference peak A, and corresponds to the component (—) having the shortest retention time. As previously stated, "zero time" is at the "sample injection" point and time increases downwardly, in FIG. 2. The second component signal peak C follows in time the peak B, and corresponds to the component (0) having the next shortest retention time. The third component peak D follows in time the peak C, and corresponds to the component (+) having the longest retention time.

It should be pointed out that in FIG. 2, for convenience, the polarity of the reference peak A is shown reversed. It will be appreciated that the polarity of peak A is actually opposite to that of peaks B, C, and D, because peak A is produced by cell 6 and peaks B, C, and D by cell 10, and these cells are in adjacent arms of the bridge. However, to utilize the recorder most efficiently, peak A can be made to appear on the recorder with the same polarity as peaks B—D, by providing a reversing switch in the connections from the bridge to the signal recorder, the switch being operated to reverse the connections utilized for peak A, as compared to the connections utilized for peaks B, C, and D. Thus, the chromatogram can actually be made to appear as illustrated in FIG. 2, and the full transverse (voltage) sensitivity of the recorder can be utilized.

In connection with FIG. 2, the following characteristics of the novel chromatogram are desired to be pointed out. The reference peak A (that is, the height of this peak) indicates system stability conditions, and sample reproducibility. Also, identification of each individual component is made by noting its retention time, calibration having previously been accomplished by determining the retention times of pure components. Further, the height of each of the component peaks B, C, and D is representative of the percentage of that particular component present in the sample.

There are, however, some restrictions imposed on the technique of this invention. The results are valid only for gases whose thermal conductivities are similar. It has been found that gases having three to five carbon atoms have sufficiently similar thermal conductivities to make component peaks B, C, and D proportional to the reference peak A, within the limits of accuracy desired.

In the hydrocarbon range of three through five carbon atoms, the thermal conductivity ratios (compared to air) are:

Propane, 0.615; n-butane, 0.552; isobutane, 0.569; n-pentane, 0.535; isopentane, 0.515. For ethanes, the thermal conductivity ratios are: ethane, 0.750; deutero ethane, 0.635. For methanes, these ratios are: methane, 1.25; deutero methane, 1.22. The thermal conductivity ratios given were determined empirically, by experiment, and were obtained from published reference data.

Therefore, a stream analyzer (gas chromatography apparatus) designed for this type of service would have a specified range of thermal conductivities of gases for which the apparatus is to be used. Traces of gases outside the specified range would not appreciably affect the results produced by the other components. The dividing points between the above ranges (the first range being for hydrocarbons having three through five carbon atoms, the second range being the ethanes, and the third the methanes) appear to present no problem in the petroleum refining industry, since ethane and methane are seldom found with the heavier hydrocarbons (three to five carbon atoms, the first range above); also, propane is seldom found in streams with butane or pentane, but when it is present its percentage is only a small part of the stream.

Tests utilizing the method and apparatus of this invention have been made. Results were linear for reference peak height plotted against sample volume, for sample sizes between 0.5 cc. and 4.0 cc., when reference tests were made with a cell 6 in which gas reached the reference filament by diffusion. (For the other arm of the Wheatstone bridge circuit, a thermal conductivity cell 10 was used in which the measuring filament 11 was located directly in the gas stream.) Results were nonlinear for reference peak height plotted against sample volume, for sample sizes between 0.2 cc. and 3.0 cc. when reference tests were made with a cell 6 in which the filament was located directly in the gas stream. It is suspected that the nonlinearity appeared because the recorder used failed to respond properly to the reference peak signals appearing in the bridge circuit. A second recorder did not show this nonlinearity.

It may be stated that physical property differences (between carrier gas and sample) other than thermal conductivity may be measured for analysis, using the proper detectors. For example, ionization potentials may be measured with an ionization gauge, gas density with a gas density balance. Also, thermistor or glow plug detectors may be used to measure thermal conductivity. As previously mentioned, it is desirable that these physical property differences between components of the sample be small. The detector signal can be read out directly, as described (with signal recorder 15), or fed to a computer.

The invention claimed is:

1. In gas chromatography apparatus, a reference cell comprising a heated wire arranged to be contacted by gases fed thereto; means for feeding a discrete quantity of the gas mixture to be analyzed to said reference cell along with a substantially continuous stream of carrier gas, the thermal conductivities of the components of said mixture being similar, means coupled to the output side of said reference cell for separating said mixture into its various components, a measuring cell comprising a heated wire arranged to be contacted by gases fed thereto; means for feeding the separated components of said mixture, along with said stream of carrier gas, from said separating means to said measuring cell, and means connecting both of said wires into a four-arm bridge network as two differentially-arranged arms thereof.

2. In gas chromatography apparatus, first and second test cells for measuring the thermal conductivity of gases fed thereto, a coupling from a source of carrier gas to said first cell, a sample injection point in said coupling, a partitioning column coupled to the output side of said first cell, a coupling from the output end of said column to said second cell, and means connecting both of said cells into a single four-arm bridge network as two differentially-arranged arms thereof.

3. In gas chromatography apparatus, a reference cell comprising a heated wire arranged to be contacted by gases fed thereto; a coupling from a source of carrier gas to said reference cell, a sample injection point in said coupling, a partitioning column coupled to the output side of said reference cell, a measuring cell comprising a heated wire arranged to be contacted by gases fed thereto; a coupling from the output end of said column to said measuring cell, and means connecting both of said wires into a single four-arm bridge network as two differentially-arranged arms thereof.

4. In gas chromatography apparatus, first and second test cells for measuring a preselected physical property of gases fed thereto, means for feeding a discrete quantity of the gas mixture to be analyzed to said first cell along with a substantially continuous stream of carrier gas, the selected physical properties of the components of said mixture being similar, means coupled to the output side of said first cell for separating said mixture into its various components following the passage of said mixture through said first cell, means for feeding the separated components of said mixture, along with said stream of carrier gas, from said separating means to said second cell, said apparatus thus operating to provide, at one point of time, only carrier gas in said second cell and carrier gas plus said mixture in said first cell and to provide, at later points of time, carrier gas plus components of the mixture in said second cell and only carrier gas in said first cell; and means for differentially comparing the measurements obtained from said first and said second cells.

5. In gas chromatography apparatus, first and second test cells for measuring the thermal conductivity of gases fed thereto, means for feeding a discrete quantity of the gas mixture to be analyzed to said first cell along with a substantially continuous stream of carrier gas, the thermal conductivities of the components of said mixture being similar, means coupled to the output side of said first cell for separating said mixture into its various components following the passage of said mixture through said first cell, means for feeding the separated components of said mixture, along with said stream of carrier gas, from said separating means to said second cell, said apparatus thus operating to provide, at one point of time, only carrier gas in said second cell and carrier gas plus said mixture in said first cell and to provide, at later points of time, carrier gas plus components of the mixture in said second cell and only carrier gas in said first cell; and means for differentially comparing the measurements obtained from said first and said second cells.

6. In a gas chromatography apparatus, first and second test cells having inlets and outlets and each including means for detecting a preselected physical property of gases fed thereto, means for feeding a substantially continuous stream of carrier gas to said first cell, means for feeding to said carrier gas stream a discrete quantity of the gas mixture to be analyzed, the selected physical properties of the components of said mixture being similar, means coupled to the outlet side of said first cell for separating said mixture into its various components following the passage of said mixture through said first cell, means for feeding the separated components of said mixture along with said carrier gas from said separating means to the inlet of said second cell, said apparatus thus operating to provide at a first point of time, only carrier gas in said second cell and carrier gas plus said mixture in said first cell and to provide, at a second point of time, carrier gas plus separated components of the mixture in said second cell and only carrier gas in said first cell, and means for differentially and sequentially, at said first and second points of time, comparing the responses of the detection means in said first and second cells.

References Cited in the file of this patent

UNITED STATES PATENTS 2,591,760    Zaikowsky            Apr. 8, 1952
2,868,011    Coggeshall           Jan. 13, 1959

OTHER REFERENCES

Book—Gas Analysis by Thermal Conductivity, Daynes-Cambrige Press, London, 1933, 36 pages 120–122.

Publication: Vapor Fractometry, by H. H. Hausdorff, September 1955, published by Perkin Elmer Corp., Norwalk, Connecticut, pages 5, 22.

Article in Analytical Chemistry, volume 29, No. 9, September 1957, pages 1263, 1264.